(12) United States Patent
Yoshida

(10) Patent No.: US 10,597,147 B2
(45) Date of Patent: Mar. 24, 2020

(54) AIRCRAFT TIRE

(71) Applicant: DAITO PRESS Mfg. Co., Ltd., Osaka-shi, Osaka (JP)

(72) Inventor: Takashi Yoshida, Osaka (JP)

(73) Assignee: DAITO PRESS MFG. CO., LTD., Osaka-shi, Osaka (JP)

( * ) Notice: Subject to any disclaimer, the term of this patent is extended or adjusted under 35 U.S.C. 154(b) by 278 days.

(21) Appl. No.: 15/656,812

(22) Filed: Jul. 21, 2017

(65) Prior Publication Data

US 2018/0043999 A1 Feb. 15, 2018

(30) Foreign Application Priority Data

Aug. 10, 2016 (JP) .................................. 2016-157446

(51) Int. Cl.
| | |
|---|---|
| *B64C 25/40* | (2006.01) |
| *B60C 13/02* | (2006.01) |
| *B60C 19/00* | (2006.01) |
| *B64C 25/00* | (2006.01) |

(52) U.S. Cl.
CPC .............. *B64C 25/40* (2013.01); *B60C 13/02* (2013.01); *B60C 19/001* (2013.01); *B64C 25/001* (2013.01); *B60C 2200/02* (2013.01)

(58) Field of Classification Search
CPC .......................... B64C 25/40; B60C 2200/02
See application file for complete search history.

(56) References Cited

U.S. PATENT DOCUMENTS

| | | | | |
|---|---|---|---|---|
| 1,833,019 | A | | 11/1931 | Faucher et al. |
| 3,233,849 | A | * | 2/1966 | Rubin ..................... B64C 25/40 |
| | | | | 244/103 S |
| 4,615,498 | A | | 10/1986 | Ochiai et al. |
| 6,032,900 | A | * | 3/2000 | Smith ..................... B64C 25/40 |
| | | | | 244/103 S |

(Continued)

FOREIGN PATENT DOCUMENTS

| | | |
|---|---|---|
| DE | 2609192 A1 | 12/1976 |
| DE | 2613486 A1 | 10/1977 |

(Continued)

OTHER PUBLICATIONS

English language Extended European Search Report (EESR) dated Sep. 21, 2017 issued in counterpart European Application No. 17180876.9.

*Primary Examiner* — Brian M O'Hara
(74) *Attorney, Agent, or Firm* — Holtz, Holtz & Volek PC

(57) ABSTRACT

An aircraft tire includes a tire body forming an outer peripheral part of an aircraft wheel; and a protrusion with a pressure receiving surface configured to receive flight wind pressure toward one end and a streamline shape tapering toward another end. The protrusion rotates the aircraft wheel before touchdown through flight wind pressure received by the pressure receiving surface. The protrusion includes a pair of legs; a weight portion with a center of gravity positioned outwardly of respective horizontal positions of the pair of legs with respect to a center line widthwise of the tire body; and a hollow part extending between the ends of the protrusion. Centrifugal force that acts on the weight portion causes the pair of legs to fall over in a direction toward an outer periphery of the tire body to narrow the hollow part for reduction of an area of the pressure receiving surface.

4 Claims, 4 Drawing Sheets

(56) References Cited

U.S. PATENT DOCUMENTS

2013/0112809 A1 5/2013 Khal et al.
2016/0059955 A1 3/2016 Yoshida

FOREIGN PATENT DOCUMENTS

| DE | 10315813 A1 | 11/2004 |
|----|----|----|
| GB | 562651 A | 7/1944 |
| GB | 2080217 A | 2/1982 |
| GB | 2352431 A | 1/2001 |
| JP | 05178290 A | 7/1993 |
| JP | 07031600 U | 6/1995 |
| JP | 09254892 A | 9/1997 |
| JP | 2004058978 A | 2/2004 |
| JP | 5763818 B1 | 8/2015 |
| WO | 2005025982 A1 | 3/2005 |
| WO | 2007114803 A1 | 10/2007 |

* cited by examiner

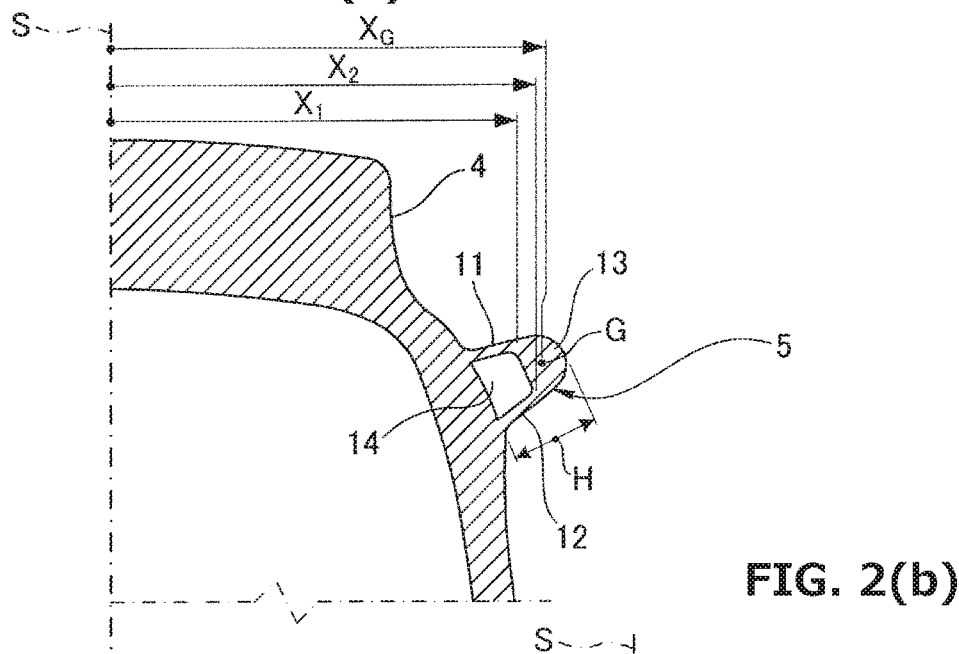
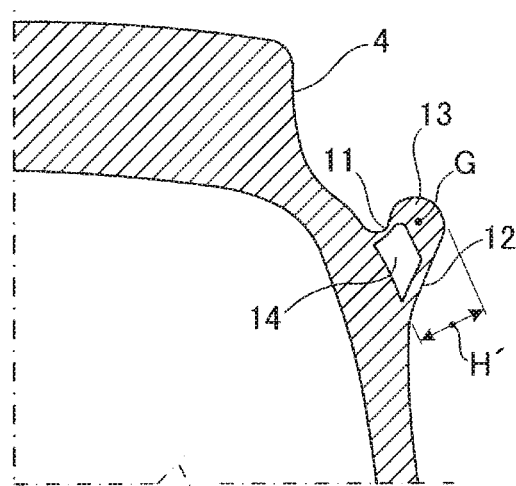
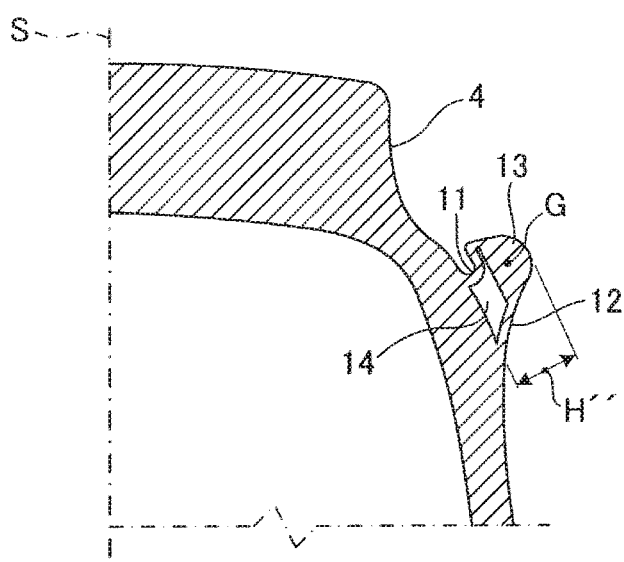

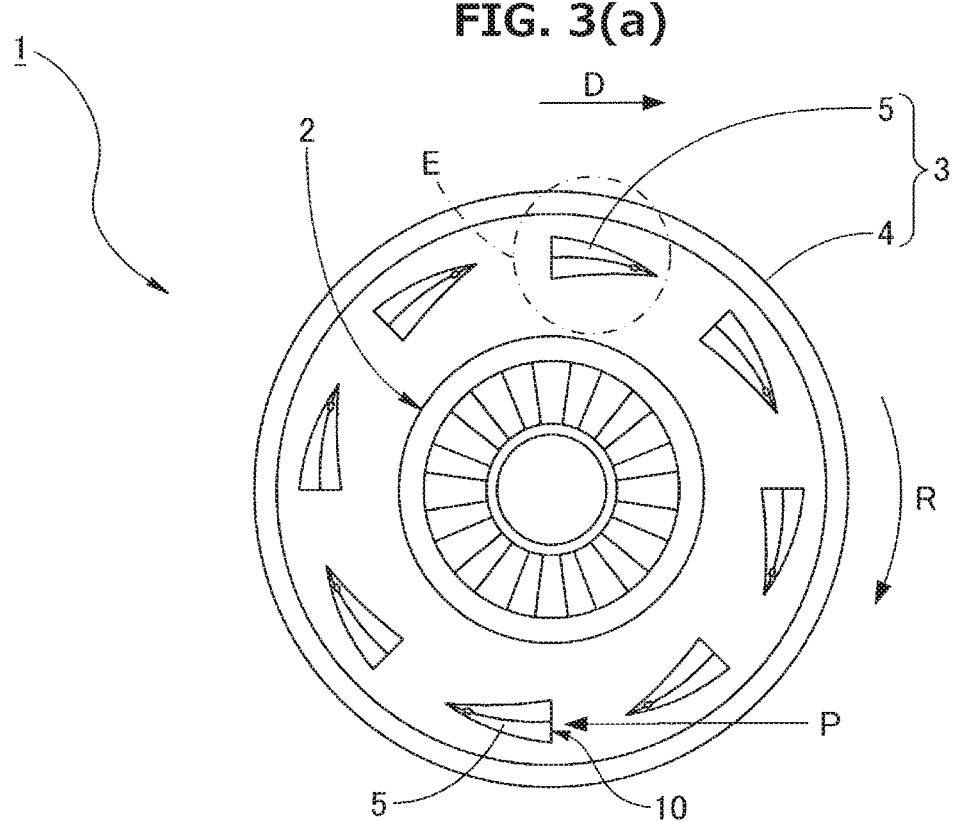
FIG. 3(a)
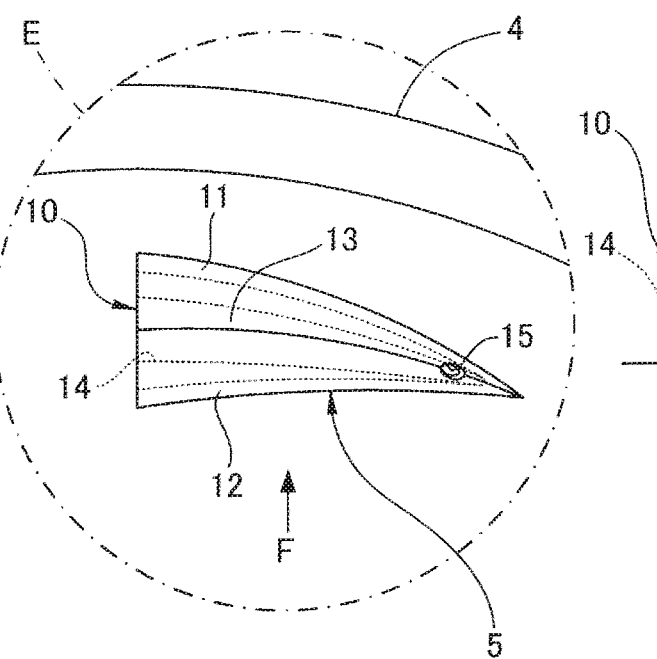
FIG. 3(b)
FIG. 3(c)

PRIOR ART    FIG. 4(a)
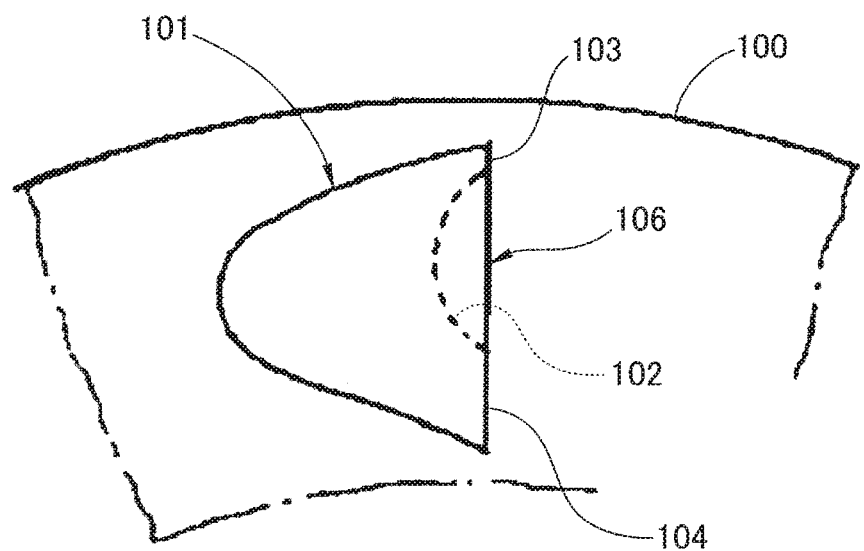
FIG. 4(b)
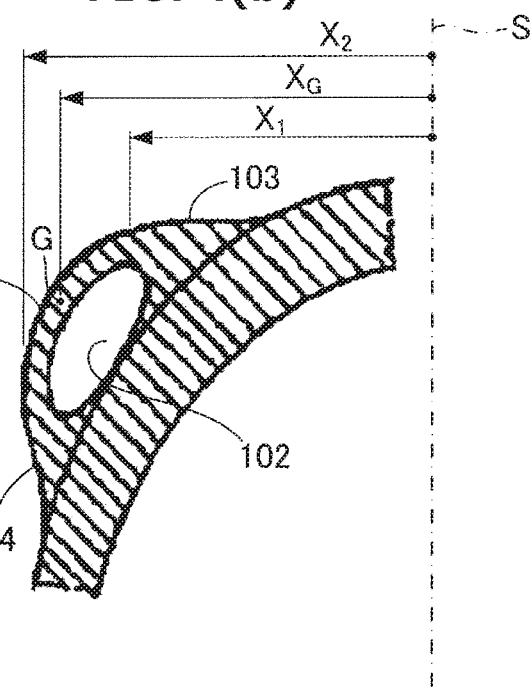
FIG. 4(c)
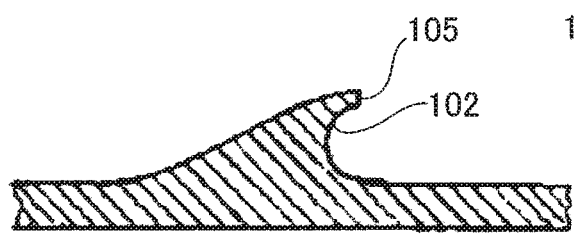

AIRCRAFT TIRE

BACKGROUND

1. Technical Field

The present invention relates to an aircraft tire which rotates by receiving flight wind pressure, and more particularly to an aircraft tire having a speed control function.

2. Description of the Related Art

An ultra-high-capacity aircraft such as Airbus A380 weighs 560 tons, and its big body must be supported by two tires at a nose landing gear and twenty tires at a main landing gear, that is, twenty two tires in total. The tire used for such an aircraft has an internal pressure six or more times higher than a tire for a passenger car, so that measures such as improving the material and surface structure of an aircraft tire itself are taken.

When an aircraft is in a landing process, an aircraft wheel remains stationary before touchdown, so that high pressurized friction is caused between a runway and the tire until rotating speed of the wheel matches a rotating speed corresponding to a flying speed (for example, about 250 km/h) of the aircraft making the touchdown. Accordingly the tire making contact with the runway is heated to a considerably high temperature, thereby problematically resulting in tire wear such as to leave a rubber tire burn mark on the runway.

To solve such a problem, the following is proposed (refer to Unexamined Japanese Utility Model Publication No. H07-31600). As shown in FIG. 4(a), a side of a tire body 100 is mounted with, on its outer peripheral side, a plurality of windmill vanes 101 oriented in the same direction. In an upper position of the tire body 100, each of the vanes 101 has, with respect to an airframe, a streamlined front portion for reduced wind resistance and a rear portion having a concave surface for increased wind resistance. By the action of flight wind pressure received by the vanes 101, an aircraft wheel is rotated before touchdown in a direction in which it rotates during a landing roll, whereby pressurized friction is reduced substantially between the runway and the tire during landing of the aircraft. In this way, the rubber tire wear that might occur during the landing is suppressed.

As shown in FIGS. 4(a) to 4(c), the vane 101 described in Unexamined Japanese Utility Model Publication No. H07-31600 includes a recess 102 that is formed by denting the vane's end to have the rear portion with the concave surface. A pressure receiving surface 106 that receives the flight wind pressure is formed of an internal surface of the recess 102, respective end faces of lateral portions 103, 104 with respect to the recess 102, and an end face of an upper portion 105 with respect to the recess 102.

Although the end of the vane 101 is provided with the recess 102, the vane 101 is otherwise solid, so that structurally it is difficult to cause the lateral portions 103, 104 to fall over in a direction from a center of the tire body 100 toward an outer periphery of the tire body 100. Moreover, a center of gravity G of the upper portion 105 is positioned between the lateral portions 103, 104. This means that when $X_G$ is a horizontal distance between a center line S widthwise of the tire body 100 and the center of gravity G of the upper portion 105 with $X_1$ being a horizontal distance between the center line S and a heightwise protruding end of the lateral portion 103 and $X_2$ being a horizontal distance between the center line S and a heightwise protruding end of the lateral portion 104, $X_2 > X_G > X_1$, so that a bending moment, affected by centrifugal force that acts on the upper portion 105 during rotation of the wheel before touchdown, cannot act effectively to cause the lateral portions 103, 104 to fall over in the direction from the center of the tire body 100 toward the outer periphery of the tire body 100. Because the lateral portions 103, 104 cannot be caused to fall over in the direction from the center of the tire body 100 toward the outer periphery of the tire body 100 by the centrifugal force that acts on the upper portion 105 during the rotation of the wheel before the touchdown, the recess 102 cannot be narrowed. Accordingly an area of the pressure receiving surface 106 cannot be reduced.

For this reason, the vanes 101 provided on the side of the tire body 100 in Unexamined Japanese Utility Model Publication No. H07-31600 cannot prevent rotating speed of the wheel from becoming too high when the wheel is rotated before the touchdown by the action of the flight wind pressure received by the vanes 101. Consequently, shock such as to accelerate the aircraft at the touchdown may problematically be caused.

In view of such a problem, the applicant of the present invention has already proposed an aircraft tire having a function of preventing rotating speed of a wheel from becoming too high during rotation of the wheel before touchdown (refer to Japanese Patent No. 5,763,818).

In the aircraft tire of Japanese Patent No. 5,763,818, protrusions each having a pressure receiving surface that receives flight wind pressure are protrusively provided on a side of a tire body. The protrusion has a hollow structure into which a weight is inserted. The protrusion is deformed by centrifugal force that acts on the weight during rotation of the wheel before touchdown. An area of the pressure receiving surface of the protrusion is thus reduced for suppression of an acceleration effect, whereby the rotating speed of the wheel is prevented from becoming too high.

However, because of having a complicated structure formed of a combination of the protrusion provided protrusively on the side of the tire body and the weight provided separately from the protrusion, the aircraft tire of Japanese Patent No. 5,763,818 has such a problem that its production is somewhat difficult.

The present invention has been made in view of the above problems, and an object of the present invention is to provide an aircraft tire capable of accomplishing, with a simple structure, a function of preventing rotating speed of a wheel from becoming too high when the wheel is rotated before touchdown by the action of flight wind pressure received by protrusions provided protrusively on a side of a tire body.

SUMMARY OF INVENTION

To achieve the above object, an aircraft tire according to the present invention includes: a tire body forming an outer peripheral part of an aircraft wheel; and a protrusion that is provided protrusively on a side of the tire body, includes at one end thereof a pressure receiving surface configured to receive flight wind pressure and has a streamline shape tapering toward another end of the protrusion along a circumference of the tire body for rotation of the aircraft wheel before touchdown in a direction in which the aircraft wheel rotates during a landing roll, through the action of the flight wind pressure received by the pressure receiving surface, wherein the protrusion includes:

a pair of legs erected on the side of the tire body in spaced relation along a radius of the tire body, the pair of legs extending along the circumference of the tire body;

a weight portion supported by the pair of legs to have its center of gravity positioned outwardly of respective horizontal positions of the pair of legs with respect to a center line widthwise of the tire body; and a hollow part defined by the tire body the pair of legs, and the weight portion, the hollow part extending between the one end and the other end of the protrusion, wherein the pressure receiving surface is formed of respective end faces of the pair of legs, an end face of the weight portion, and an internal surface of the hollow part, and wherein the pair of legs is caused, by centrifugal force that acts on the weight portion during the rotation of the aircraft wheel before the touchdown, to fall over in a direction from a center of the tire body toward an outer periphery of the tire body to narrow the hollow part for reduction of an area of the pressure receiving surface (a first aspect of the prevent invention).

In the present invention, it is preferable that a thickness of the weight portion in a protruding direction of the protrusion be greater than a thickness of each of the pair of legs along the radius of the tire body (a second aspect of the present invention).

In the present invention, it is preferable that the protrusion be provided with a drain hole allowing the hollow part to communicate exteriorly (a third aspect of the present invention).

In the aircraft tire of the present invention, the hollow part is provided to extend between the one end and the other end of the protrusion, so that there is no resistance between the pair of legs. Thus, the pair of legs structurally falls over easily in the direction from the center of the tire body toward the outer periphery of the tire body. With the weight portion supported by the pair of legs to have its center of gravity positioned outwardly of the respective horizontal positions of the pair of legs with respect to the center line widthwise of the tire body, a bending moment can act effectively on the pair of legs for causing the legs to fall over in the direction from the center of the tire body toward the outer periphery of the tire body as a result of being effected by the centrifugal force that acts on the weight portion during rotation of the wheel before touchdown. With the pair of legs thus caused by the centrifugal force that acts on the weight portion during the rotation of the wheel before the touchdown to fall over in the direction from the center of the tire body toward the outer periphery of the tire body the hollow part is narrowed, whereby the area of the pressure receiving surface can be reduced. With the area of the pressure receiving surface reduced, an acceleration effect is suppressed, whereby rotating speed of the wheel can be prevented from becoming too high. Such a functional effect can be obtained by simply using the pair of legs, the weight portion, and the hollow part for formation of the protrusion protrusively provided on the side of the tire body. Thus, the function of preventing the rotating speed of the wheel from becoming too high when the wheel is rotated before touchdown by the action of the flight wind pressure received by each of the protrusions provided protrusively on the side of the tire body can be accomplished by such a structure that is simpler than a conventional combination of a hollow protrusion and a separately provided weight.

With the thickness of the weight portion in the protruding direction of the protrusion being greater than the thickness of each of the pair of legs along the radius of the tire body, increased centrifugal force can act on the weight portion, thereby causing, without fail, the pair of legs to fall over in the direction from the center of the tire body toward the outer periphery of the tire body.

There are cases where rain water, for example, collects and freezes in the hollow part provided in the protrusion and may cause malfunction because the hollow part cannot be narrowed. Accordingly the protrusion is provided with the drain hole allowing the hollow part to communicate exteriorly. In this way even when, for example, rain water tends to collect in the hollow part, the rain water can be discharged from the drain hole, whereby the malfunction can be prevented.

BRIEF DESCRIPTION OF THE DRAWINGS

FIGS. 2(a) to 2(c) are sectional views of an essential part taken widthwise of the aircraft tire, illustrating how a pair of legs falls over in a direction from a center of a tire body toward an outer periphery of the tire body due to centrifugal force that acts on a weight portion;

FIGS. 3(a) to 3(c) illustrate an aircraft tire according to another exemplary embodiment of the present invention, with FIG. 3(a) being a side view of a wheel including the aircraft tire mounted, FIG. 3(b) being an enlarged view of part E in FIG. 3(a) and FIG. 3(c) being a view seen in a direction of arrow F in FIG. 3(b); and FIGS. 4(a) to 4(c) illustrate a prior art.

DETAILED DESCRIPTION

A concreate exemplary embodiment of an aircraft tire according to the present invention is described next with reference to the accompanying drawings.

<Description of an Aircraft Wheel>

Figure 1A:
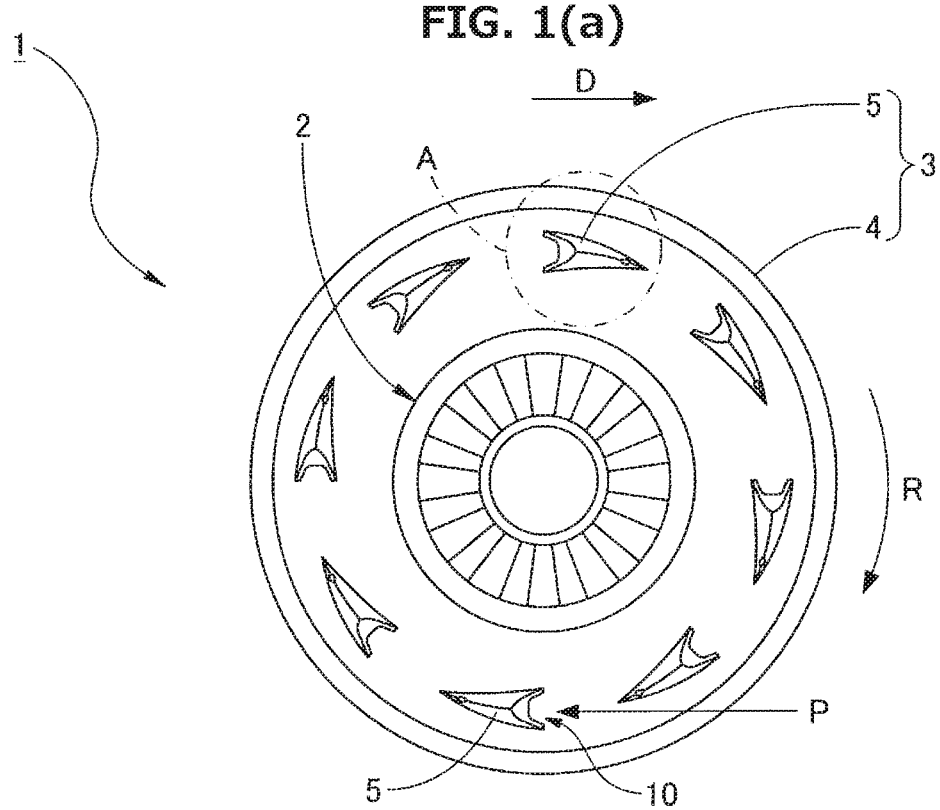
FIGS. 1(a) to 1(c) illustrate an aircraft tire according to an exemplary embodiment of the present invention, with FIG. 1(a) being a side view of a wheel including the aircraft tire mounted, FIG. 1(b) being an enlarged view of part A in FIG. 1(a) and FIG. 1(c) being a view seen in a direction of arrow B in FIG. 1(b)
Figure 1B:
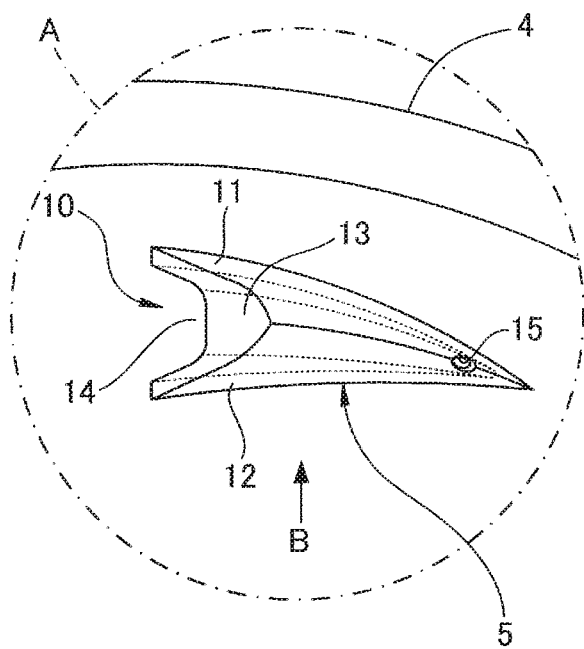
Figure 1C:
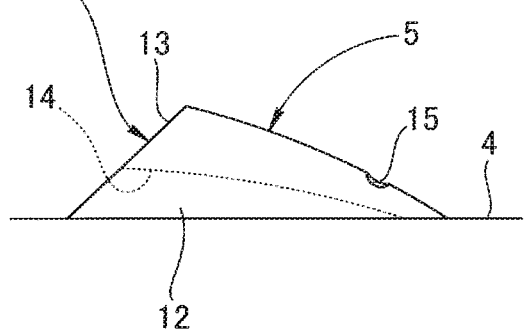

The aircraft wheel 1 shown in FIGS. 1(a) to 1(c) is formed by mounting the aircraft tire 3 to a wheel 2 and rotates during a landing roll in a direction of arrow R in the drawing with respect to an aircraft flight direction of arrow D in the drawing.

<Description of the Aircraft Tire>

The aircraft tire 3 includes a tire body 4 forming an outer peripheral part of the wheel 1, and a plurality of protrusions 5 that is formed integrally with the tire body 4 for receiving flight wind pressure (indicated by arrow P in FIG. 1(a)). The protrusions 5 are circumferentially provided in a protrusive manner at predetermined pitches on an outer peripheral side of a side of the tire body 4. By the action of the flight wind pressure received by the protrusions 5, the wheel 1 can be rotated before touchdown in the direction (of arrow R) in which the wheel 1 rotates during the landing roll.

<Description of the Protrusions>

Each of the protrusions 5 includes at one end thereof a pressure receiving surface 10 configured to receive the flight wind pressure and has such a streamline shape that it narrows to taper toward another end thereof along a circumference of the tire body 4 while its protruding height above the side of the tire body 4 reduces, heading toward the other end along the circumference of the tire body 4. Such a streamline shape does not cause air turbulence and can prevent abnormal noise. It is to be noted that the streamline shape can appropriately be made longer or shorter than the one shown in this exemplary embodiment.

As shown in FIG. 1(b), each of the protrusions 5 includes a pair of legs 11, 12, a weight portion 13, and a hollow part 14.

<Description of the Legs>

The pair of legs 11, 12 is erected on the side of the tire body 4 so as to protrude from the outer peripheral side of the tire body's side in spaced relation along a radius of the tire body 4 (along a direction from a center of the tire body 4 toward an outer periphery of the tire body 4). The pair of legs 11, 12 extends along the circumference of the tire body 4. Spacing between the pair of legs 11, 12 reduces, heading from the one end of the protrusion 5 toward the other end of the protrusion 5 along the circumference of the tire body 4. As shown in FIG. 1(c), the pair of legs 11, 12 is disposed in opposed relation so that its protruding height above the side of the tire body 4 reduces, heading from the one end of the protrusion 5 toward the other end of the protrusion 5 along the circumference of the tire body 4.

<Description of the Weight Portion>

As shown in FIG. 2(a), the weight portion 13 is semielliptical or mountain-shaped, tapering in a protruding direction of the protrusion 5. A thickness of this weight portion 13 in the protruding direction of the protrusion 5 is sufficiently greater than a thickness of each of the pair of legs 11, 12 along the radius of the tire body 4. In this way increased centrifugal force can act on the weight portion 13, thereby causing, without fail, the pair of legs 11, 12 to fall over in the direction from the center of the tire body 4 toward the outer periphery of the tire body 4.

The weight portion 13 is supported by the pair of legs 11, 12 to have its center of gravity G positioned outwardly of respective horizontal positions of the pair of legs 11, 12 with respect to a center line S widthwise of the tire body 4. In other words the weight portion 13 is supported by the pair of legs 11, 12 so that when $X_G$ is a horizontal distance between the center line S and the center of gravity G of the weight portion 13 with $X_1$ being a horizontal distance between the center line S and a heightwise protruding end of the leg 11 along the outer periphery of the tire body 4 and $X_2$ being a horizontal distance between the center line S and a heightwise protruding end of the leg 12 along the center of the tire body 4, $X_G > X_2 > X_1$ in a state of FIG. 2(a) before the pair of legs 11, 12 falls over in the direction from the center of the tire body 4 toward the outer periphery of the tire body 4 as a result of being caused by the centrifugal force that acts on the weight portion 13 during rotation of the wheel 1 before touchdown. With the weight portion 13 supported by the pair of legs 11, 12 to have its center of gravity G positioned outwardly of the respective horizontal positions of the pair of legs 11, 12 with respect to the center line S, a bending moment can act effectively on the pair of legs 11, 12 for causing the legs 11, 12 to fall over in the direction from the center of the tire body 4 toward the outer periphery of the tire body 4 as a result of being effected by the centrifugal force that acts on the weight portion 13 during rotation of the wheel 1 before touchdown.

<Description of the Hollow Part>

The hollow part 14 is defined by the side of the tire body 4, the pair of legs 11, 12, and the weight portion 13 and extends between the one end of the protrusion 5 and the other end of the protrusion 5 as shown in FIGS. 1(b) and 1(c). With the hollow part 14 provided to extend between the one end and the other end of the protrusion 5, there is no resistance between the pair of legs 11, 12. Thus, the pair of legs 11, 12 structurally falls over easily in the direction from the center of the tire body 4 toward the outer periphery of the tire body 4.

The pressure receiving surface 10 of the protrusion 5 is formed of respective end faces of the pair of legs 11, 12, an end face of the weight portion 13, and an internal surface of the hollow part 14.

<Description of a Drain Hole>

There are cases where rain water, for example, collects and freezes in the hollow part 14 provided in the protrusion 5 and may cause malfunction because the hollow part 14 cannot be narrowed. Accordingly, the protrusion 5 is provided with, at the other end thereof the drain hole 15 allowing the hollow part 14 to communicate exteriorly. In this way even when, for example, rain water tends to collect in the hollow part 14, the rain water can be discharged exteriorly from the drain hole 15, whereby the malfunction can be prevented.

<Description of the Rotation of the Wheel at the Time of Landing>

When the wheel 1 of FIG. 1(a) that includes the mounted aircraft tire 3 having the above-described structure juts out of an aircraft in the landing process the wheel 1 is rotated before touchdown in the direction (of arrow R in the drawing) in which the wheel 1 rotates during the landing roll, by the action of the flight wind pressure (indicated by arrow P in the drawing) received by the pressure receiving surface 10 of each of the protrusions 5.

<Description of Changes in Flight Wind Pressure Receiving Area>

In a speed range in which actual rotating speed V of the wheel 1 before touchdown (this speed is hereinafter referred to as "actual rotating speed V") is lower than a rotating speed corresponding to a flying speed (for example, about 250 km/h) of the aircraft making the touchdown, the pair of legs 11, 12 is in an upright condition as shown in FIG. 2(a) with an opening area of the hollow part 14 maximized. As the actual rotating speed V of the wheel 1 increases before the touchdown through the action of the flight wind pressure received by each of the pressure receiving surfaces 10, centrifugal force increasingly acts on the weight portion 13, thereby shifting the weight portion 13 outward along the radius of the tire body 4 (in the direction from the center of the tire body 4 toward the outer periphery of the tire body 4) as shown in FIGS. 2(b) and 2(c). Accordingly, the pair of legs 11, 12 falls over in the direction from the center of the tire body 4 toward the outer periphery of the tire body 4, the protruding height H of the protrusion 5 is reduced (H>H'>H"), and the hollow part 14 is narrowed, whereby the area of the pressure receiving surface 10 is reduced. With the area of the pressure receiving surface 10 thus reduced, a wheel acceleration effect that might be caused by the action of the flight wind pressure received by the pressure receiving surfaces 10 is suppressed, whereby the rotating speed of the wheel 1 can be prevented from becoming too high, and shock such as to accelerate the aircraft at the touchdown can be prevented.

<Description of a Functional Effect>

According to the aircraft tire 3 of the present exemplary embodiment, the centrifugal force that acts on the weight portion 13 during rotation of the wheel 1 before touchdown causes the pair of legs 11, 12 to fall over in the direction from the center of the tire body 4 toward the outer periphery of the tire body 4, whereby the hollow part 14 is narrowed. Accordingly the area of the pressure receiving surface 10 can be reduced. With the area of the pressure receiving surface 10 reduced, the acceleration effect is suppressed, so that the rotating speed of the wheel 1 can be prevented from becoming too high. Such a functional effect can be obtained by simply using the pair of legs 11, 12, the weight portion 13, and the hollow part 14 for formation of the protrusion 5 provided protrusively on the side of the tire body 4. Thus, the function of preventing the rotating speed of the wheel 1 from becoming too high when the wheel 1 is rotated before touchdown by the action of the flight wind pressure received by each of the protrusions 5 provided protrusively on the side of the tire body 4 can be accomplished by such a structure that is simpler than a conventional combination of a hollow protrusion and a separately provided weight.

The exemplary embodiment of the aircraft tire according to the present invention has been described above. However, the structure described in the above exemplary embodiment is not restrictive of the present invention. Appropriate modifications of the structure can be made in the present invention without departing from the spirit of the present invention.

For example, although in the above exemplary embodiment, the pressure receiving surface 10 of the protrusion 5 is inclined toward the other end (a right side in FIGS. 1(b) and 1(c)) of the protrusion 5 at an acute angle to the side of the tire body 4 as shown in FIGS. 1(a) to 1(c), the present invention is not limited to this. As shown in FIGS. 3(a) to 3(c), a pressure receiving surface 10 of a protrusion 5 may make an angle of 90° (or substantially 90°) with the side of the tire body 4.

INDUSTRIAL APPLICABILITY

Because of having the characteristic of being capable of accomplishing, with a simple structure, a function of preventing rotating speed of a wheel from becoming too high when the wheel is rotated before touchdown by the action of flight wind pressure received by protrusions provided protrusively on a side of a tire body, an aircraft tire of the present invention is suitable for use as a wheel tire of an aircraft that lands at a high flying speed and has greater industrial applicability.

What is claimed is:

1. An aircraft tire comprising:
   a tire body forming an outer peripheral part of an aircraft wheel; and
   a protrusion that is provided on a side of the tire body so as to protrude from the side of the tire body, the protrusion including at one end thereof a pressure receiving surface configured to receive flight wind pressure and having a streamline shape tapering toward another end of the protrusion along a circumference of the tire body, and the protrusion causing rotation of the aircraft wheel before touchdown in a direction in which the aircraft wheel rotates during a landing roll through the action of flight wind pressure received by the pressure receiving surface,
   wherein the protrusion includes:
       a pair of legs erected on the side of the tire body in spaced relation along a radius of the tire body, the pair of legs extending along the circumference of the tire body;
       a weight portion supported by the pair of legs to have its center of gravity positioned outwardly of respective horizontal positions of the pair of legs with respect to a center line widthwise of the tire body; and
       a hollow part defined by the tire body, the pair of legs, and the weight portion, the hollow part extending between the one end and the other end of the protrusion,
   wherein the pressure receiving surface is formed of respective end faces of the pair of legs, an end face of the weight portion, and an internal surface of the hollow part,
   wherein the pair of legs is caused, by centrifugal force that acts on the weight portion during rotation of the aircraft wheel before the touchdown, to fall over in a direction from a center of the tire body toward an outer periphery of the tire body to narrow the hollow part and thereby reduce an area of the pressure receiving surface, and
   wherein the weight portion is supported by the pair of legs such that $X_G > X_2 > X_1$ is satisfied in a state before the pair of legs is caused to fall over in the direction from the center of the tire body toward the outer periphery of the tire body by the centrifugal force acting on the weight portion during rotation of the aircraft wheel before the touchdown, where $X_G$ is a horizontal distance between the center line and the center of gravity of the weight portion, $X_2$ is a horizontal distance between the center line and a heightwise protruding end of the leg of the pair of legs closer to a center of the tire body, and $X_1$ is a horizontal distance between the center line and a heightwise protruding end of the leg of the pair of legs closer to the outer periphery of the tire body.

2. The aircraft tire according to claim 1, wherein a thickness of the weight portion in a protruding direction of the protrusion is greater than a thickness of each of the pair of legs along the radius of the tire body.

3. The aircraft tire according to claim 1, wherein the protrusion is provided with a drain hole allowing the hollow part to communicate exteriorly.

4. The aircraft tire according to claim 2, wherein the protrusion is provided with a drain hole allowing the hollow part to communicate exteriorly.

* * * * *